United States Patent Office 3,449,453
Patented June 10, 1969

3,449,453
PROCESS FOR HYDROGENATING NAPHTHALENE TO 1,4-DIHYDRONAPHTHALENE
George L. Seibel, Cincinnati, Ohio, and Leo H. Broering, Fort Wright, Ky., assignors to National Distillers and Chemical Corporation, New York, N.Y., a corporation of Virginia
No Drawing. Filed Aug. 31, 1967, Ser. No. 664,637
Int. Cl. C07c 5/10
U.S. Cl. 260—667      7 Claims

ABSTRACT OF THE DISCLOSURE

A process is provided for greatly increasing the efficiency of the hydrogenation of naphthalene to 1,4-dihydronaphthalene, by carrying out the hydrogenation of the naphthalene in a solvent for naphthalene in a weight ratio to the naphthalene within the range from about 4:1 to about 6:1, thereby to facilitate the separation of 1,4-dihydronaphthalene from the other reaction products.

---

This invention relates to a process for the hydrogenation of naphthalene to 1,4-dihydronaphthalene, and more particularly to an improvement in the process which facilitates recovery of 1,4-dihydronaphthalene from the reaction mixture, resulting in increased yields.

The dihydro derivatives of aromatic hydrocarbons, including 1,4-dihydronaphthalene, have recently been employed as molecular weight moderators in the controlled polymerization of unsaturated organic compounds with alfin catalysts. An alfin polymerization catalyst gives an unusually rapid rate of polymerization and good yields. However, alfin rubbers as conventionally produced, have extremely high molecular weights, in general over 2 million and often over 5 million, which tend to make the alfin rubbers very tough and exhibit little breakdown and extremely poor banding on being milled. U.S. Patents Nos. 3,067,187, patented Dec. 4, 1962, and 3,223,691, patented Dec. 14, 1965, to Greenberg et al., show that the polymerization reaction and the molecular weight of alfin rubbers can be controlled by carrying out the polymerization in the presence of a dihydro derivative of an aromatic hydrocarbon, such as 1,4-dihydronaphthalene, as a molecular weight moderator. Thus, 1,4-dihydronaphthalene has become an important starting material in the process for preparing alfin rubbers.

It has long been known to prepare 1,4-dihydronaphthalene by reducing naphthalene with sodium and alcohol. The naphthalene is dissolved in a solvent in an amount to provide a weight ratio of solvent to naphthalene from about 0.5:1 up to about 3:1, and a dispersion of sodium in a suitable solvent is mixed therewith. An alcohol is added to the mixture to react with sodium to form a corresponding sodium alkoxide, and hydrogen is thereby released. The hydrogen reduces the naphthaline to 1,2- and 1,4-dihydronaphthalene.

In working up the reaction mixture, water is added to the reaction mass, to hydrolyze the sodium alkoxide to the alcohol plus sodium hydroxide. Inasmuch as the sodium hydroxide may cause the isomerization of 1,4-dihydronaphthalene to the 1,2-isomer, the sodium hydroxide is removed as rapidly and as completely as possible. This is done by allowing the reaction mass to settle, thereby forming an aqueous layer containing the bulk of the sodium hydroxide, and then decanting off the aqueous layer. The remainder of the reaction mass is then washed several times with water, and allowed to settle and decanted, to remove residual sodium hydroxide and also the alcohol. If desired, the product can be concentrated by stripping off the solvent and dried, for example, through a molecular sieve column.

It has been found that this procedure is rather inefficient and results in relatively poor yields of the desired 1,4-dihydronaphthalene product, poor naphthalene accountability, i.e., the amount of naphthalene in the reaction products as a percentage of that used as a starting material, and an undesirably low ratio of 1,4-dihydronaphthalene to the 1,2-isomer. The poor results obtained are believed to be due in part to large amounts of undispersed sodium alkoxide, which disrupt proper mixing of the reactants and control of the reaction, and in part to the formation of stable emulsions during the washing steps, which prevent efficient washing of the product and a clean separation of the aqueous layer containing sodium hydroxide from the product.

In accordance with the instant invention, the yield of 1,4-dihydronaphthalene, the naphthalene accountability, and the ratio of 1,4-dihydronaphthalene to the 1,2-isomer in the product, can be substantially increased by carrying out the hydrogenation of the naphthalene in a solvent system containing a solvent for the naphthalene in a weight ratio to the naphthalene within the range from about 4:1 to about 6:1. The use of the large quantities of the solvent for the naphthalene relative to the naphthalene, i.e. to provide a ratio of solvent:naphthalene of at least about 4:1, ensures that the sodium alkoxide formed remains dispersed, and thus does not disrupt proper mixing of the reactants and control of the reaction. In addition, the process of the instant invention substantially reduces or eliminates formation of stable emulsions during the washing steps, and results in the formation of a well-defined sharp separation between the aqueous layer containing sodium hydroxide and the remainder of the reaction mass (or the organic layer), thereby facilitating the rapid and complete removal of the aqueous layer containing the sodium hydroxide from the remainder of the reaction mass, and thereby inhibiting formation of the 1,2-isomer.

It is due to the forementioned reasons that the improvement of the instant invention substantially improves the yields of the desired 1,4-dihydronaphthalene product, improves naphthalene accountability, and also increases the ratio of 1,4-dihydronaphthalene to the 1,2-isomer.

The final product obtained in accordance with the process of the invention is generally a mixture of 1,4- and 1,2-dihydronaphthalene, and 1,2,3,4 - tetrahydronaphthalene (tetralin), and contains a high weight ratio of the 1,4-isomer to the 1,2-isomer. This mixture of hydronaphthalenes can be employed, as is, as a molecular weight moderator in the polymerization processes set out in U.S. Patents Nos. 3,067,187 and 3,223,691, discussed hereinbefore. However, if substantially pure 1,4-dihydronaphthalene is required, the 1,4-isomer can be recovered by standard techniques, such as crystallization and distillation.

In carrying out the process in accordance with the instant invention, a high purity naphthalene should preferably be employed, in order to minimize side reactions of the naphthalene and sodium, which could result in the formation of stable emulsions during the washing steps, which prevent a clean separation of the aqueous layer from the layer containing the product.

As indicated hereinbefore, in order to ensure good mixing of the reactants and a well-defined clean separation between the aqueous layer containing the sodium hydroxide and the remainder of the reaction mass, with a sharp interface in the quenching (i.e. the first wash step) and in subsequent washing stages, the solvent for the naphthalene should be employed in a weight ratio to the naphthalene within the range from about 4:1 to about 6:1 and preferably within the range from about 4.25:1 to about 5.0:1. A proportion below about 4:1 will not ensure a well-defined interface between the aqueous layer and the remainder of the reaction mass, while a proportion above 6:1 does not significantly improve the separation, and results in increased volumes of solvent which must be handled.

The naphthalene can be dissolved in any suitable solvent in which naphthalene and the alcohol are soluble, and which is chemically inert to the reactants and the products. Typical solvents include branched and straight chain aliphatic hydrocarbon solvents. The branched chain aliphatic hydrocarbons which are suitable for use in the present invention are those having from about 4 to about 15 carbon atoms. Examples of suitable hydrocarbons include: 2-methylpropane; 2-methylbutane, 2,3-dimethylbutane; 2-methylpentane; 3-methylpentane, 2,2-dimethylpentane; 2,3-dimethylpentane; 2,4-dimethylpentane, 2,2,4-trimethylpentane; 2-methylhexane; 3-methylhexane; 2,4-dimethylhexane; 2,5-dimethylhexane; 2,2,4-trimethylhexane; 2,3,4-trimethylhexane; 3,3,4-trimethylhexane, 2-methylheptane; 3-methylheptane; 2,3-dimethylheptane; 3,4-dimethylpentane; 2 - methyloctane; 2,3 - dimethyloctane; 2 - methylnonane; 3,4 - dimethylnonane; 3-methyldecane; 2-methylundecane; 2 - methyldodecane; 2,2,4 - trimethyldodecane, etc., and mixtures thereof. While the examples have been listed with respect to the mono, di, and trimethyl substituted aliphatic hydrocarbons, it should be appreciated that other lower alkyl substituted hydrocarbons are considered applicable. Other suitable alkyl radicals include ethyl, isopropyl, butyl, etc. Especially suitable, since they are readily obtainable, are commercial mixtures of branched aliphatic hydrocarbons, such as "Isopar C" which is a mixture of isoparaffins containing 70 to 80% 2,2,4-trimethyl pentane and homologues thereof, Isopar E, a specific analysis of which will hereinafter be given in Examples 2 and 3, and hexane.

Cycloaliphatic hydrocarbons that can be used include cyclohexane, cyclopentane, cycloheptane, cyclooctane and methyl cyclohexane. Straight chain aliphatic hydrocarbons that can be used include n-pentane, n-hexane, n-heptane, n-octane, n-decane, n-nonane and n-undecane.

The dispersion of sodium which is admixed with the naphthalene-solvent mixture should contain an amount of sodium sufficient to release an amount of hydrogen within the range from about 5 to about 10% in excess of that stoichiometrically required to reduce substantially all of the naphthalene to 1,4-dihydronaphthalene. An excess of alcohol of from about 5 to about 10%, based on the amount of sodium present, above the amount required to produce such hydrogen is used, to prevent free sodium from being present at the conclusion of the reaction.

The dispersion of sodium can be prepared by following conventional techniques, such as disclosed in U.S. Patent No. 3,012,974, to Robinson et al., dated Dec. 12, 1961. The concentration of sodium in the dispersion is not critical, so long as enough sodium is present to supply the 5 to 10% excess of hydrogen stoichiometrically required to react with the naphthalene.

Usually a sodium concentration in the dispersion within the range from about 2 to about 50% is satisfactory. In preparing the dispersion, the sodium can be dispersed in any suitable solvent in which sodium dispersions are commonly prepared, such as hydrocarbons, such as petroleum ether, pentane, cyclopentane, cyclohexane, the hexanes, heptanes, octanes, mineral spirits, mineral oil; alkylates, which comprise branched paraffin hydrocarbons with high octane number, generally blended with other hydrocarbon mixtures, for example, Isopar E, and Isopar C and any of the above-mentioned branched chain aliphatic hydrocarbons. Odorless mineral spirits, boiling range 349–406° F., and the Isopars are preferred.

The alcohol should be added very slowly to the naphthalene-sodium-solvent system, with good agitation to ensure that the sodium alkoxide formed will be well dispersed in the reaction mixture. During the reaction of the alcohol with the sodium and the subsequent reduction of the naphthalene to 1,4-dihydronaphthalene, the temperature of the reaction mixture should be maintained within the range from about 75 to about 250° F. or higher, and preferably from about 110 to about 215° F. The maximum reaction temperature is the decomposition temperature of the products or reactants.

The reaction of the naphthalene, sodium and alcohol should be allowed to proceed until substantially all of the naphthalene has been reduced to 1,4-dihydronaphthalene. This can require a reaction time of from about 1 to about 30 hours, depending upon the reactants and the amounts employed and the reaction conditions. Normally, a reaction time of from about 3 to about 20 hours is employed.

Alcohols employed in the process of the instant invention can be any monohydric alcohol which will react with sodium to form the sodium alkoxide and release hydrogen. Typical examples of such alcohols are methanol, ethanol, propanol, isopropanol, the butanols, pentanols, hexanols, heptanols, octanols, nonanols, and decanols. Isopropanol is preferred, inasmuch as the liberation rate of the hydrogen during the formation of the alkoxide is slower and consequently more controllable where isopropanol is used.

In the water quench step or initial water wash, water is added slowly to the reaction mixture to decompose the alkoxide to sodium hydroxide and the alcohol. When this decomposition is complete, a large volume of additional water is added and the mixture is agitated from, for example, 5 to 15 minutes. This mixture is allowed to settle, resulting in the formation of an aqueous layer containing the bulk of the sodium hydroxide, and this layer is then separated. A weight ratio of water to solvent for the naphthalene present in the reaction product of within the range from about 0.6:1 to about 1.25:1, and preferably from about 0.7:1 to about 0.9:1, is desired to ensure complete reduction of the alkoxide to the alcohol and sodium hydroxide and to dilute the sodium hydroxide formed.

The subsequent water washes after the removal of the initial aqueous layer containing the bulk of the sodium hydroxide are important in ensuring the removal of the bulk of the alcohol and residual sodium hydroxide, and thereby reduce the possibility of the formation of large amounts of the 1,2-dihydronaphthalene. The water-to-naphthalene solvent ratio employed in the subsequent water washes should be within the range from about 0.25:1 to about 2:1, and preferably from about 1:1 to about 1.7:1. Employing ratios of water to solvent below the above range results, in many cases, in an incomplete removal of sodium hydroxide and alcohol, while the use of water to solvent ratios higher than those set out in the above range affords no significant benefits, and results in increased volumes of water in the reaction product, which must be removed therefrom.

After the quench and washing steps, the product can be concentrated by removing water and alcohol by distilling from about ½ to about ¾ of the initial solvent charge. Final drying can be accomplished by passing the dihydronaphthalene-solvent solution through a suitable molecular sieve.

The process of the instant invention can be carried out employing conventional equipment including a closed agitated vessel, jacketed for water cooling, and provided with an inert gas purge, such as nitrogen, suitable reactant charging ports or inlets, preferably at the top of the vessel, and a discharge port or outlet at the bottom of the vessel. The vessel can contain a look box at the bottom of the vessel so that the aqueous layer-organic layer interface developed in the reaction mixture can be observed.

The following example in the opinion of the inventors represents a preferred embodiment of their invention.

EXAMPLE 1

Run 1

1,4-dihydronaphthalene was prepared in accordance with the process of the instant invention as follows. 200 lb. of refined naphthalene was dissolved in 1000 lb. of dried commercial hexane in a 500 gallon 316 SS Pfaudler reactor, equipped with a 3 H.P., 90 r.p.m., anchor type agitator, and provided with a nitrogen purge, and a port for the addition of sodium dispersion, as well as rotameters for charging isopropanol and water. A 25% sodium dispersion in odorless mineral spirits, boiling range 349–406° F., containing 76.8 lb. sodium, i.e., a sodium excess of about 7% based on the amount of naphthalene in the mixture, was added to the naphthalene-hexane mixture.

298 lb. of isopropanol, representing about a 58.5% excess based on the amount of naphthalene in the mixture, was added to the mixture over a period of about five hours during which time the maximum temperature of the mixture was about 145° F. The reaction mass was stirred overnight (about 16 hours) before quenching and washing.

About 800 lb. of water was mixed with the reaction mass for about 15 minutes, while maintaining a temperature of 100° F., and the resulting mixture was allowed to settle for about 15 minutes. An aqueous layer thereby formed which contained the bulk of the sodium hydroxide. A well-defined interface between the aqueous layer and the remainder of the reaction mass was observed. The aqueous layer was easily separated from the remainder of the reaction mass and found to weigh about 829 lb. A small emulsion layer (47 lb.) was also recovered which when allowed to settle was found to be principally an aqueous phase.

The remainder of the reaction mass was then washed with about 600 lb. of water by stirring the water and the reaction mass for about 15 minutes at a temperature of 98° F., and allowing the mixture to settle for about 15 minutes. Again, a well-defined interface between the aqueous layer and the remainder of the reaction mass was observed. The aqueous layer weighing about 802 lb. was recovered from the remainder of the reaction mass without difficulty.

The reaction mass was then washed with 600 lb. of water by stirring the water and reaction mass for about 15 minutes at a temperature of 96° F. The mixture was allowed to settle for about 15 minutes after which a well-defined interface between the aqueous layer and the remainder of the reaction mass was observed. The aqueous layer weighing 698 lb. was recovered from the remainder of the reaction mass without difficulty.

Thereafter, the reaction mass was distilled to remove some 700 lb. hexane containing small amounts of water and isopropanol. The product was then transferred to stainless steel drums.

Samples of the final product were analyzed for tetralin (1,2,3,4-tetrahydronaphthalene), 1,2-dihydronaphthalene, 1,4-dihydronaphthalene and naphthalene. The naphthalene conversion to 1,4-dihydronaphthalene was found to be about 88% and the conversion to 1,2-dihydronaphthalene was found to be about 12.3% or a weight ratio of the 1,4-isomer to the 1,2-isomer of about 7.13:1. The naphthalene accountability was found to be about 101.9% (virtually 100%).

As a control, 1,4-dihydronaphthalene was prepared as follows. The reactor employed was essentially the same as that employed in Example 1 with the exception that it had a capacity of 100 gallons. The 500 gallon reactor was not employed inasmuch as the separation of the aqueous and organic phases in a 500 gallon reactor would have been very difficult.

About 221 lb. of hexane solvent was admixed with 69.6 lb. of naphthalene (hexane:naphthalene 3.2:1) in the reactor for approximately 16 hours (overnight) to ensure complete dissolution of the naphthalene. The solution was cooled to room temperature and a 25% dispersion of sodium and Isopar E (the composition of which is set out in Examples 2 and 3) containing 26.8 lb. of sodium and representing about a 7% excess of sodium based on the naphthalene present, was admixed therewith. Thereafter, about 103.5 lb. of isopropanol was added to the mixture over a period of about 3.3 hours while maintaining the reaction temperature at a maximum of about 170° F. The amount of isopropanol added represented about a 58.5% excess based on the naphthalene present. By the time the stoichiometric amount of isopropanol had been added, the consistency of the reaction mass had increased to such extent that the agitator was completely ineffective. The addition of excess isopropanol had little effect since the sodium isopropoxide was essentially insoluble in the isopropanol. A considerable quantity of the alcohol remained on top of the reaction mass; little change was noted after stirring overnight. 65 lb. of water was added slowly to the reaction mixture to convert the isopropoxide to isopropanol and sodium hydroxide. An emulsion between the water and organic layers formed thereby preventing separation of the two layers. Therefore an additional 210 lb. of water was added and the mixture was heated to 128° F. After a two-hour settling period, a good separation of the aqueous and organic phases was obtained. For the second wash, 150 lb. of water were added, but again, an emulsion was noted when it was attempted to remove the water layer. An additional 105 lb. of water were added and the mixture was heated to 110° F. After a brief settling time, a good separation was obtained. For the third wash, 210 lb. of water was used; the mixture was stirred for some six hours and then allowed to settle over a weekend. 150 lb. of hexane was distilled off with water and isopropanol.

The following results were obtained in the control run.

Conversion of naphthalene to 1,4-dihydronaphthalene in the final product was found to be about 26.9%. The ratio of 1,4-dihydronaphthalene to 1,2-dihydronaphthalene in the final product was found to be 0.47:1 and the naphthalene accountability was about 93.0%.

Accordingly, it is clearly seen that where the hexane to naphthalene ratio employed was 5:1 in accordance with the instant invention, the naphthalene conversion to 1,4-dihydronaphthalene was about 61% higher, the ratio of the 1,4-isomer to the 1,2-isomer was about seven times higher, and the naphthalene accountability was substantially higher than where the process was carried out in accordance with the control run employing the hexane and naphthalene in a ratio of 3.2:1.

EXAMPLES 2 AND 3

1,4-dihydronaphthalene was prepared in accordance with the process of the instant invention as follows employing the 100 gallon reactor as used in the control. Refined naphthalene was dissolved in dried commercial hexane to provide a weight ratio of hexane:naphthalene of 4.3:1 in Example 2 and 5.0:1 in Example 3. A 25% sodium dispersion in Isopar E was added to the naphthalene-hexane mixture. Isopar E, a material devoid of n-hydrocarbons, has the following composition:

| Component: | Weight percent |
|---|---|
| 2,2,4-trimethylpentane | 2.2 |
| 2,5-dimethylhexane<br>2,4-dimethylhexane | 4.8 |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane<br>3,4-dimethylheptane<br>2,3-dimethylheptane<br>3,3,4-trimethylhexane | 5.7 |
| 15 other iso-components | 13.7 |
| $C_9$ naphtha+$C_{10+}$ | 1.8 |
| | 100.0 |

Isopropanol was added to the mixture over a period of from about three to about five hours during which time the maximum temperature of the mixture was about 145° F. to 155° F. In Example 2 where the hexane:naphthalene ratio was 4.3:1, during the isopropanol addition, the mixture became quite thick. However, it was possible to maintain reasonably good agitation. The reaction mass was stirred overnight (about 16 hours) before quenching and washing.

In a first water wash or quench, water was mixed with the reaction mass, and the resulting mixture was allowed to settle. An aqueous layer thereby formed which contained the bulk of the sodium hydroxide. A well-defined interface between the aqueous layer and the remainder of the reaction mass was observed. The aqueous layer was easily separated from the remainder of the reaction mass.

The remainder of the reaction mass was then washed with water by stirring the water and the reaction mass and allowing the mixture to settle. Again, a well-defined interface between the aqueous layer and the remainder of the reaction mass was observed. The aqueous layer was recovered from the remainder of the reaction mass without difficulty.

The reaction mass was then washed with more water by stirring the water and reaction mass and the mixture was allowed to settle. A well-defined interface between the aqueous layer and the remainder of the reaction mass was observed. The aqueous layer was recovered from the remainder of the reaction mass without difficulty.

Thereafter, the reaction mass was distilled to remove water and isopropanol from the product. The product was then transferred to stainless steel drums.

Table I below sets out pertinent data for Examples 2 and 3 including lbs. of hexane solvent, naphthalene, sodium and isopropanol, percent of sodium theoretically required, percent of isopropanol theoretically required, reaction temperatures and washing conditions including lbs. of water added, stirring time, settling time and lbs. of aqueous layer decanted.

TABLE I

| Example No. | 2 | 3 |
|---|---|---|
| Hexane solvent, lb | 217 | 250 |
| Naphthalene charge, lb | 50 | 50 |
| Hexane-naphthalene ratio | 4.3:1 | 5.0:1 |
| Sodium charge, lb.[1] | 19.20 | 19.20 |
| Percent of theoretical [2] | 107 | 107 |
| Isopropanol charge, lb | 74.5 | 74.5 |
| Percent of theoretical [2] | 158.5 | 158.5 |
| Addition time, hrs | 4.0 | 4.5 |
| Reaction temperature: | | |
| Initial, °F | 86 | 90 |
| Maximum, °F | 160 | 160 |
| First water wash: | | |
| Water added, lb | 200 | 200 |
| Temperature, °F | 75 | 89 |
| Stirring time, hr | 0.2 | 0.1 |
| Settling time, hr | 1.5 | 0.1 |
| Aqueous layer decanted, lb | 188 | 204 |
| Second water wash: | | |
| Water added, lb | 155 | 150 |
| Stirring time, hr | 0.2 | 0.1 |
| Settling time, hr | 0.6 | 0.1 |
| Aqueous layer decanted, lb | 216 | 206 |
| Third water wash: | | |
| Water added, lb | 150 | 150 |
| Stirring time, hr | 17 | 0.1 |
| Settling time, hr | 7 | 0.1 |
| Aqueous layer decanted, lb | 170 | 174 |

[1] Sodium charged as 25.6% dispersion in Isopar E.
[2] Based on naphthalene.

Samples of the final products in both Examples 2 and 3 were analyzed for tetralin (1,2,3,4-tetrahydronaphthalene), 1,2-dihydronaphthalene, 1,4-dihydronaphthalene and naphthalene, and the results are set out in Table II below.

TABLE II

| Example No. | 2 | 3 |
|---|---|---|
| Naphthalene conversion, percent: | | |
| (a) to 1,4-dihydronaphthalene | 73.6 | 67.3 |
| (b) to 1,2-dihydronaphthalene | 18.4 | 20.8 |
| Weight ratio 1,4 isomer:1,2 isomer | 4.0:1 | 3.24:1 |
| Naphthalene accountability, percent | 93.0 | 94.0 |
| Weight of total product, lb | 164 | 127 |

Having regard to the foregoing disclosure, the following is claimed as the inventive and patentable embodiments thereof:

1. In the process for the hydrogenation of naphthalene to 1,4-dihydronaphthalene including the steps of reacting naphthalene, sodium and an alcohol in an inert solvent to form sodium alkoxide and hydrogenate the naphthalene to 1,4-dihydronaphthalene, adding water to the reaction mass to convert the sodium alkoxide to the alcohol and form an aqueous layer containing sodium hydroxide, separating the aqueous layer from the remainder of the reaction mass, and washing the remainder of the reaction mass to remove the alcohol and residual sodium hydroxide, the improvement which comprises carrying out the hydrogenation of the naphthalene in solution in an inert solvent for naphthalene in a weight ratio to the naphthalene within the range from about 4:1 to about 6:1, thereby to facilitate the separation of the aqueous layer containing the sodium hydroxide from the 1,4-dihydronaphthalene, increase the yield of 1,4-dihydronaphthalene, and reduce the formation of 1,2-dihydronaphthalene.

2. A process in accordance with claim 1, wherein the solvent for the naphthalene is an aliphatic hydrocarbon.

3. A process in accordance with claim 2, wherein the solvent is hexane.

4. A process in accordance with claim 1, wherein the alcohol is isopropanol.

5. A process in accordance with claim 1, wherein the solvent for naphthalene is used in a ratio to the naphthalene within the range from about 4.25:1 to about 5:1.

6. A process in accordance with claim 1, wherein the sodium dispersion contains an amount of sodium to give an amount of hydrogen within the range from about 5 to about 10% in excess of that stoichiometrically required to reduce the naphthalene present to 1,4-dihydronaphthalene.

7. A process in accordance with claim 1, wherein the alcohol is employed in an excess within the range from about 5 to about 10% based on the amount of sodium present.

References Cited

UNITED STATES PATENTS

| 1,971,743 | 8/1934 | Bertsch | 260—667 |
| 2,055,708 | 9/1936 | Scott | 260—667 |
| 2,171,867 | 9/1939 | Scott et al. | 260—667 |
| 2,182,242 | 12/1939 | Wooster | 260—667 |
| 2,204,978 | 6/1940 | Bartlett | 260—667 |
| 2,432,843 | 12/1947 | Whitmore | 260—666 |
| 2,473,997 | 6/1949 | Hausley | 260—667 |
| 3,122,593 | 2/1964 | Wilson | 260—667 |
| 3,274,272 | 9/1966 | Amagasa | 260—666 |

FOREIGN PATENTS

| 306,724 | 7/1918 | Germany. |
| 370,974 | 11/1921 | Germany. |
| 473,457 | 3/1929 | Germany. |
| 488,759 | 1/1930 | Germany. |

OTHER REFERENCES

Arthur J. Birch: J. Chem. Soc., 1944, pp. 430–436.

DELBERT E. GANTZ, Primary Examiner.

V. O'KEEFE, Assistant Examiner.